(12) United States Patent
Tanabe

(10) Patent No.: US 7,114,673 B2
(45) Date of Patent: Oct. 3, 2006

(54) TAPE-LIKE RECORDING MEDIUM RUNNING DEVICE

(75) Inventor: Naohisa Tanabe, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 601 days.

(21) Appl. No.: 10/440,156

(22) Filed: May 19, 2003

(65) Prior Publication Data
US 2003/0218089 A1 Nov. 27, 2003

(30) Foreign Application Priority Data
May 24, 2002 (JP) ............................. 2002-150304

(51) Int. Cl.
*B65H 59/38* (2006.01)
(52) U.S. Cl. .............................. 242/413.2; 242/334.5; 242/333.7
(58) Field of Classification Search ................ 242/413, 242/413.5, 413.2, 414.1, 334.5, 355, 333.5, 242/333.8, 333.7, 421.2
See application file for complete search history.

(56) References Cited
U.S. PATENT DOCUMENTS

| | | | | |
|---|---|---|---|---|
| 3,669,382 A | * | 6/1972 | Struzina ..................... | 242/413 |
| 3,841,583 A | * | 10/1974 | Kawa ....................... | 242/414.1 |
| 4,015,799 A | * | 4/1977 | Koski et al. ............. | 242/414.1 |
| 4,341,363 A | * | 7/1982 | Inatome ................... | 242/413.5 |
| 4,561,608 A | * | 12/1985 | O'Gwynn et al. ........ | 242/333.5 |
| 5,022,604 A | * | 6/1991 | Shin ........................ | 242/414.1 |
| 5,222,684 A | * | 6/1993 | Yoneda et al. ........... | 242/334.5 |
| 5,600,504 A | * | 2/1997 | Seo ......................... | 242/333.7 |

* cited by examiner

*Primary Examiner*—William A. Rivera
(74) *Attorney, Agent, or Firm*—Steptoe & Johnson LLP

(57) ABSTRACT

A stop command detecting unit detects an operation transition from fast forwarding/rewinding modes to a stop mode, a take-up side reel braking unit and a supply side reel braking unit start a braking operation based on the stop command, and a driving motor of the take-up side reel is driven at a specified current value set by a motor current value setting unit for a specified time set by a current adding time setting unit to provide the take-up side reel with rotary torque in the winding direction. Hence, the supply side reel rotates together with the take-up side reel until the supply side reel is stopped, thereby preventing occurrence of a slack on the tape.

4 Claims, 7 Drawing Sheets

FIG. 2
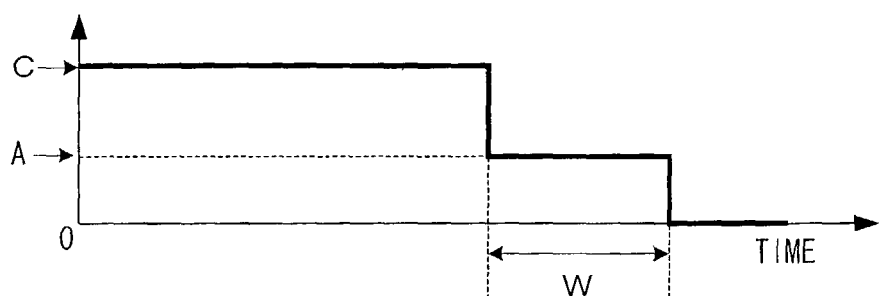
(a) MOTOR CURRENT VALUE
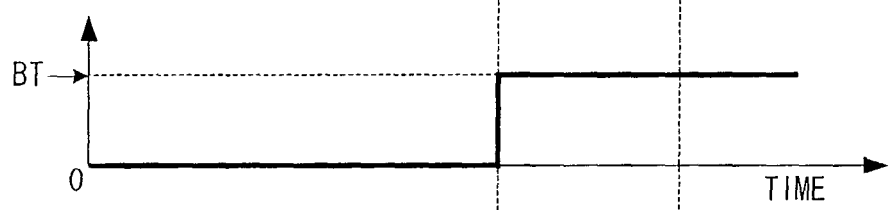
(b) TAKE-UP REEL BRAKING FORCE
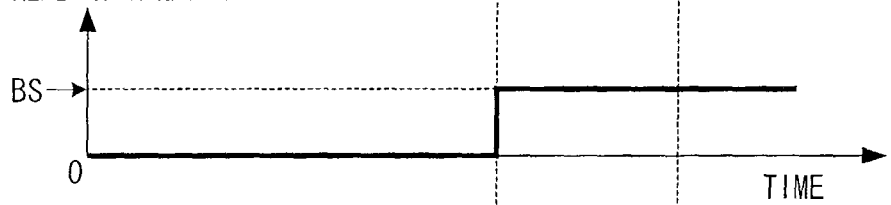
(c) SUPPLY REEL BRAKING FORCE
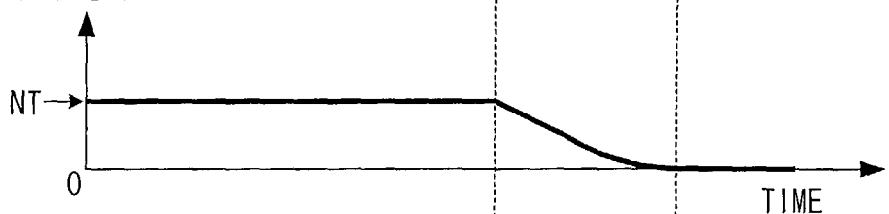
(d) TAKE-UP REEL ROTATIONS
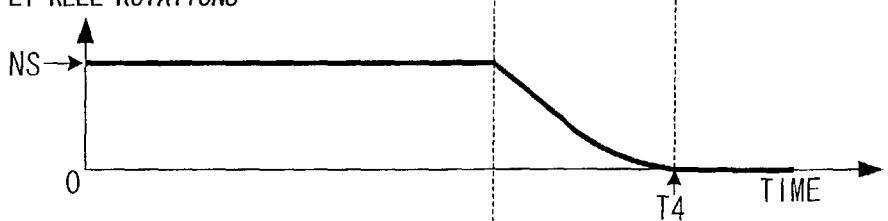
(e) SUPPLY REEL ROTATIONS

TAPE-LIKE RECORDING MEDIUM RUNNING DEVICE

FIELD OF THE INVENTION

The present invention relates to a tape-like recording medium running device installed in a magnetic recording/reproducing device such as a video tape recorder using a tape as a magnetic recording medium.

BACKGROUND OF THE INVENTION

In recent years, as recording mediums, the market of disk-like recording mediums has expanded with an advantage of a high access speed. Under the present circumstances, it has been necessary to improve an access speed by achieving a high-speed winding speed of a tape in equipment such as a video tape recorder, which uses a tape-like magnetic recording medium (hereinafter, referred to as a tape) as a recording medium. Hence, motors for driving reels for winding tapes have increased in rotation speed and reduced in fast forwarding time and rewinding time to improve usability.

FIG. 5 shows a conventional tape-like recording medium running device and a configuration required to achieve an operation for making a transition from fast forwarding (FF)/rewinding (REW) modes to a stop mode of a tape. Such a tape-like recording medium running device is disclosed in Japanese Unexamined Patent Publication No. 04-48460 and so on.

In FIG. 5, a tape 22 has a leading edge which is connected and wound by a supply reel 3 and a trailing edge which is connected to a take-up reel 2.

Reference numeral 2A denotes a take-up reel base engaged with the set take-up reel 2. Reference numeral 3A denotes a supply reel base engaged with the set supply reel 3.

Reference numeral 1 denotes a motor which transmits rotation to a take-up side reel of the take-up reel base 2A and the supply reel base 3A via a belt and a gear to rotationally drive the take-up side reel. To be specific, in the case of the fast forwarding (FF) mode in which the tape 22 wound around the supply reel 3 is wound up by the take-up reel 2 at high speed, the motor 1 rotationally drives the take-up reel base 2A of the take-up reel 2 serving as a take-up side reel. In the case of the rewinding (REW) mode in which the tape 22 wound around the take-up reel 2 is wound up by the supply reel 3 at high speed, the motor 1 rotationally drives the supply reel base 3A of the supply reel 3 serving as a take-up side reel.

Reference numeral 5 denotes a take-up reel braking unit which brakes the rotation of the take-up reel base 2A.

Reference numeral 6 denotes a supply reel braking unit which brakes the rotation of the supply reel base 3A.

Reference numeral 50 denotes a stop command detecting unit which detects that an operating unit 23 is operated to make a stop from the fast forwarding (FF) or the rewinding (REW) mode and produces first and second stop commands 50A and 50B.

Reference numeral 8 denotes a mode changing unit which makes a change to the stop mode by operating the take-up reel braking unit 5 and the supply reel braking unit 6 in accordance with the fast forwarding (FF)/rewinding (REW) modes to apply braking forces to the take-up reel base 2A and the supply reel base 3A when the first stop command 50a is detected.

Reference numeral 4 denotes a rotation detecting unit which has an MR element (magneto-resistance element) for detecting polarities (north pole and south pole) magnetized at predetermined intervals around the motor 1 and for outputting a frequency signal. The rotation detecting unit outputs a signal of a frequency proportionate to a rotation speed of the motor 1.

Reference numeral 51 denotes a speed control unit which operates the motor 1 via a driving unit 52 so that the output of the rotation detecting unit 4 comes close to a target number of rotations corresponding to an operation mode instructed by the operating unit 23, to be specific, a target number of rotations corresponding to the fast forwarding (FF)/rewinding (REW) modes until the second stop command 50B is detected. When the second stop command 50B is detected, the rotation of the motor 1 is stopped.

The following will discuss operations of the conventional tape-like recording medium running device configured thus.

First, in the fast forwarding (FF) mode, a rotation command to wind up the tape 2 at high speed (e.g., 8 m/s) is outputted by the speed control unit 51 and the motor 1 is operated via the driving unit 52. Namely, as shown in FIG. 6(a), current of a predetermined value C is applied to the motor 1 and the rotation is controlled according to the current value.

The take-up reel 2 where rotation is transmitted via the rotation of the motor 1 winds up the tape 22 from the supply reel 3.

When the operating unit 23 is operated to provide a command to stop a forwarding operation at timing T1, this command is detected by the stop command detecting unit 50. In the speed control unit 51, a command to stop the rotation of the motor 1 is outputted, current applied to the motor 1 is changed to 0 from the predetermined current value C, and the motor 1 is rotated only by inertial force thereafter.

When the command to stop the fast forwarding (FF) mode is provided at the timing T1, in the mode changing unit 8, a mechanism is changed from the fast forwarding mode to the stop mode. As shown in FIGS. 6(b) and 6(c), when it is assumed that the reel braking unit 5 has braking force of BT1 and the supply reel braking unit 6 has braking force of BS1, it is necessary to satisfy the following relationship:

BT1<BS1 so that the take-up reel 2 is prevented from stopping earlier than the supply reel 3 and the supply reel is pulled and rotated by the take-up reel 2.

This is because when the take-up reel 2 is stopped earlier than the supply reel 3, the tape 22 sent by the rotation of the supply reel 3 cannot be wound by the take-up reel 2 and a slack appears on the tape 22, resulting in a damage on the tape 22 in the subsequent running of the tape.

DISCLOSURE OF THE INVENTION

However, in the above conventional configuration, when the take-up reel braking unit 5 is larger in braking force than the supply reel braking unit 6 due to variations in braking force of the take-up reel braking unit 5 and the supply reel braking unit 6 or the like, the tape 22 is stopped with a slack, resulting in a damage on the tape 22 in the subsequent running of the tape.

Particularly when a running speed of the tape 22 is set high to shorten forwarding time, the reel increases in inertial force and braking force is likely to vary. When stopping is made from the high running speed, the supply reel 3 increases in inertial force and thus the take-up reel 2 is like to stop earlier than the supply reel 3.

The above problem will be discussed in detail in accordance with FIGS. 7(a) to 7(e).

Like FIG. 6(a), FIG. 7(a) shows a current value C of the motor 1 in the fast forwarding (FF) mode.

FIGS. 7(b) and 7(c) show that braking force BT of the take-up reel braking unit 5 and braking force BS of the supply reel braking unit 6 are varied and the following relationship is established:

BT>BS.

FIG. 7(d) shows the number of rotations NT of the take-up reel 2 in the fast forwarding mode, and FIG. 7(e) shows the number of rotations NS of the supply reel 3 in the fast forwarding mode. In this description, it is assumed that the take-up reel 2 is larger in tape winding diameter than the supply reel 3, so that the following relationship is established:

NT<NS.

First, in the fast forwarding (FF) mode, the motor 1 is driven at the current value C of the motor as shown in FIG. 7(a), and the take-up reel 2 is rotated with the number of rotations NT and the supply reel 3 is rotated with the number of rotations NS, as shown in FIGS. 7(d) and 7(e), so that the tape 22 is caused to run at a high speed to perform fast forwarding.

Subsequently, a stop command is provided at timing T1, a value of current supplied to the motor 1 is set at 0 as shown in FIG. 7(a), the take-up reel braking unit 5 brakes the take-up reel 2 with braking force BT (FIG. 7(b)), and the supply reel braking unit 6 brakes the supply reel 3 with braking force BS (FIG. 7(c)). In this case, as shown in FIGS. 7(d) and 7(e), the take-up reel 2 and the supply reel 3 gradually decrease in the number of rotations and stop in the end.

Since the relationship of BT>BS is established due to variations in the braking force BT of the take-up reel braking unit 5 and the braking force BS of the supply reel braking unit 6, the take-up reel 2 stops at timing T2 and the supply reel 3 stops at timing T3 later than the timing T2. In this way, the take-up reel 2 stops earlier than the supply reel 3, causing a slack S to occur on the tape 22.

The above description refers to an example of a fast forwarding (FF) mode for taking up the tape 22 at a high speed from the supply reel 3 to the take-up reel 2. The same problem arises in a rewinding (REW) mode for taking up the tape 22 at a high speed from the take-up reel 2 to the supply reel 3. Namely, when the supply reel braking unit 6 becomes larger in braking force than the take-up reel braking unit 5 due to variations in braking force of the take-up reel braking unit 5 and the supply reel braking unit 6 or the like, the tape 22 stops with a slack, causing a damage to the tape 22 in the subsequent running of the tape. Particularly when a running speed of the tape 22 is set high to shorten rewinding time, the supply reel 3 is more likely to stop earlier than the take-up reel 2.

The present invention is devised to solve the above problem and has an object to provide a tape-like recording medium running device which can stop a tape-like recording medium without a slack even when a take-up reel braking unit becomes larger in braking force than a supply reel braking unit due to variations in braking force of the take-up reel braking unit and the supply reel braking unit.

In order to attain the object, the tape-like recording medium running device of the present invention is characterized in that when a transition is made from fast forwarding (FF)/rewinding (REW) modes to a stop mode, braking on a take-up side reel and a supply side reel is started, and current is applied to a motor so as to give rotary torque to the take-up side reel.

According to this, even when the take-up side reel and the supply side reel are braked, the take-up side reel is driven by the motor. Thus, it is possible to prevent the supply side reel from stopping earlier than the take-up side reel, thereby stopping the tape-like recording medium without a slack.

The tape-like recording medium running device of the present invention, in which a take-up side reel is driven by a motor to perform running for winding up a tape-like recording medium from a supply side reel, comprises a take-up side reel braking unit for braking the rotation of the take-up side reel, a supply-side reel braking unit for braking the rotation of the supply side reel, a stop command detecting unit for detecting a command to stop the running for winding, a motor current value setting unit for controlling a current value for driving the motor, and a current adding time setting unit for controlling specified time for supplying current specified by the motor current value setting unit to the motor, wherein immediately after the stop command detecting unit detects a stop command, the take-up side reel braking unit and the supply side reel braking unit start braking the take-up side reel and the supply side reel, and the motor current value setting unit and the current adding time setting unit apply current to the motor so as to give rotary torque to the take-up side reel.

According to this, even when the take-up side reel and the supply side reel are braked, the take-up side reel has the motor driven by the motor current value setting unit and the current adding time setting unit. Thus, it is possible to prevent the supply side reel from stopping earlier than the take-up side reel, thereby stopping the tape-like recording medium without a slack.

The present invention further comprises a winding diameter detecting unit for detecting a winding diameter of the tape-like recording medium wound around the supply side reel or the take-up side reel, whereby the motor current value setting unit changes a value of current applied to the motor according to the winding diameter detected by the winding diameter detecting unit.

The present invention further comprises a winding diameter detecting unit for detecting a winding diameter of the tape-like recording medium wound around the supply side reel or the take-up side reel, whereby the current adding time setting unit changes time for applying current to the motor according to the winding diameter detected by the winding diameter detecting unit.

The present invention further comprises a winding diameter detecting unit for detecting a winding diameter of the tape-like recording medium wound around the supply side reel or the take-up side reel, whereby the motor current value setting unit changes a value of current applied to the motor according to the winding diameter detected by the winding diameter detecting unit, and the current adding time setting unit changes time for applying current to the motor according to the winding diameter detected by the winding diameter detecting unit.

According to the foregoing, driving of the take-up side reel can be controlled in correspondence to the magnitude of the inertial force on the supply side reel, the magnitude being determined by the winding diameter. Thus, it is possible to prevent the supply side reel from stopping earlier than the take-up side reel.

BRIEF DESCRIPTION OF THE DRAWINGS

FIG. 2 shows changes of a motor current value with time when a transition is made from a fast forwarding (FF) mode to a stop mode, according to Embodiment 1;

DESCRIPTION OF PREFERRED EMBODIMENTS

The present invention will be described below in accordance with the following embodiments.

Embodiment 1

Figure 1:
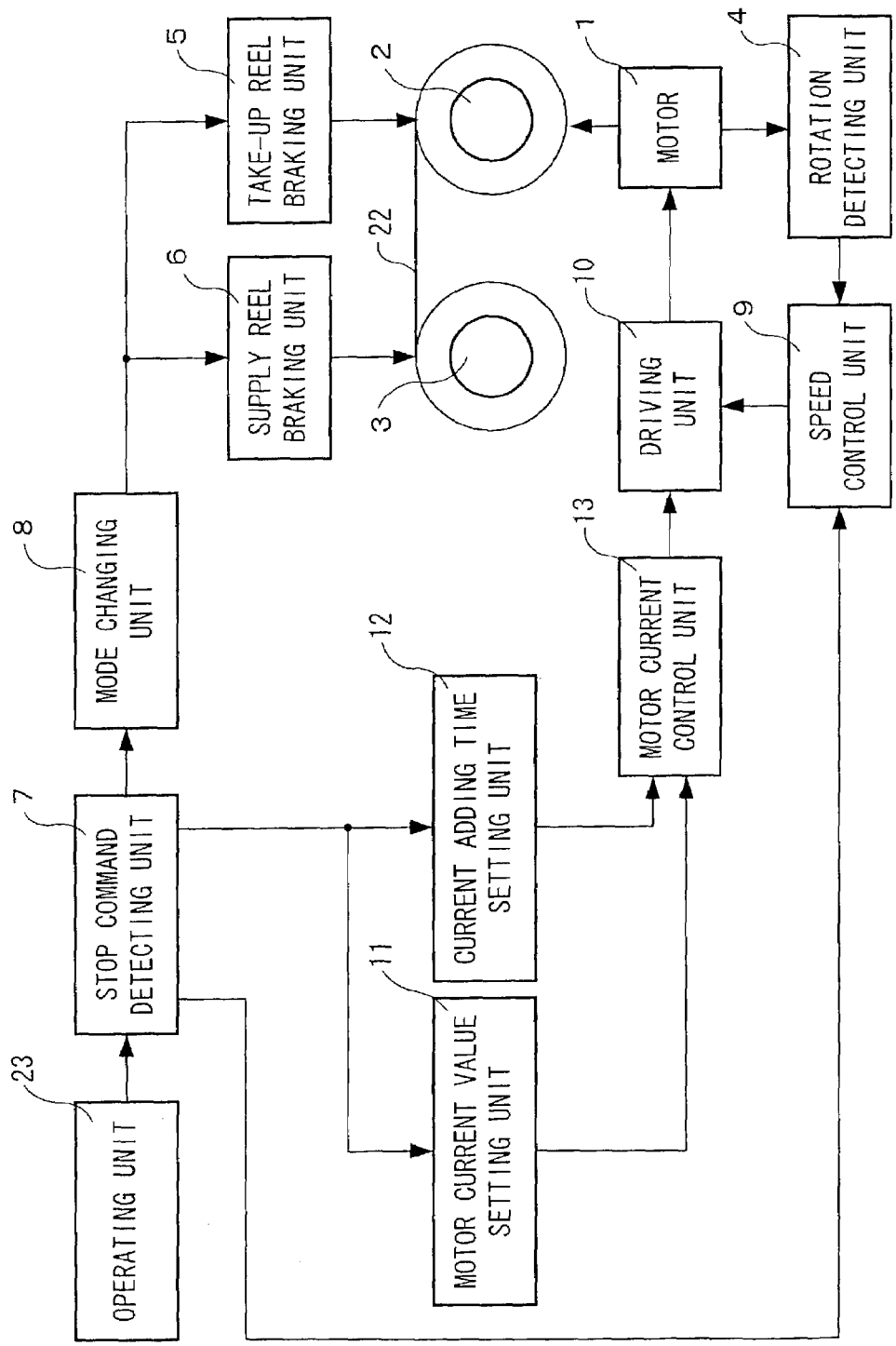
FIG. 1 is a structural diagram showing a tape-like recording medium running device according to Embodiment 1 of the present invention.

FIGS. 1 and 2 show Embodiment 1 of the present invention.

Figure 5:
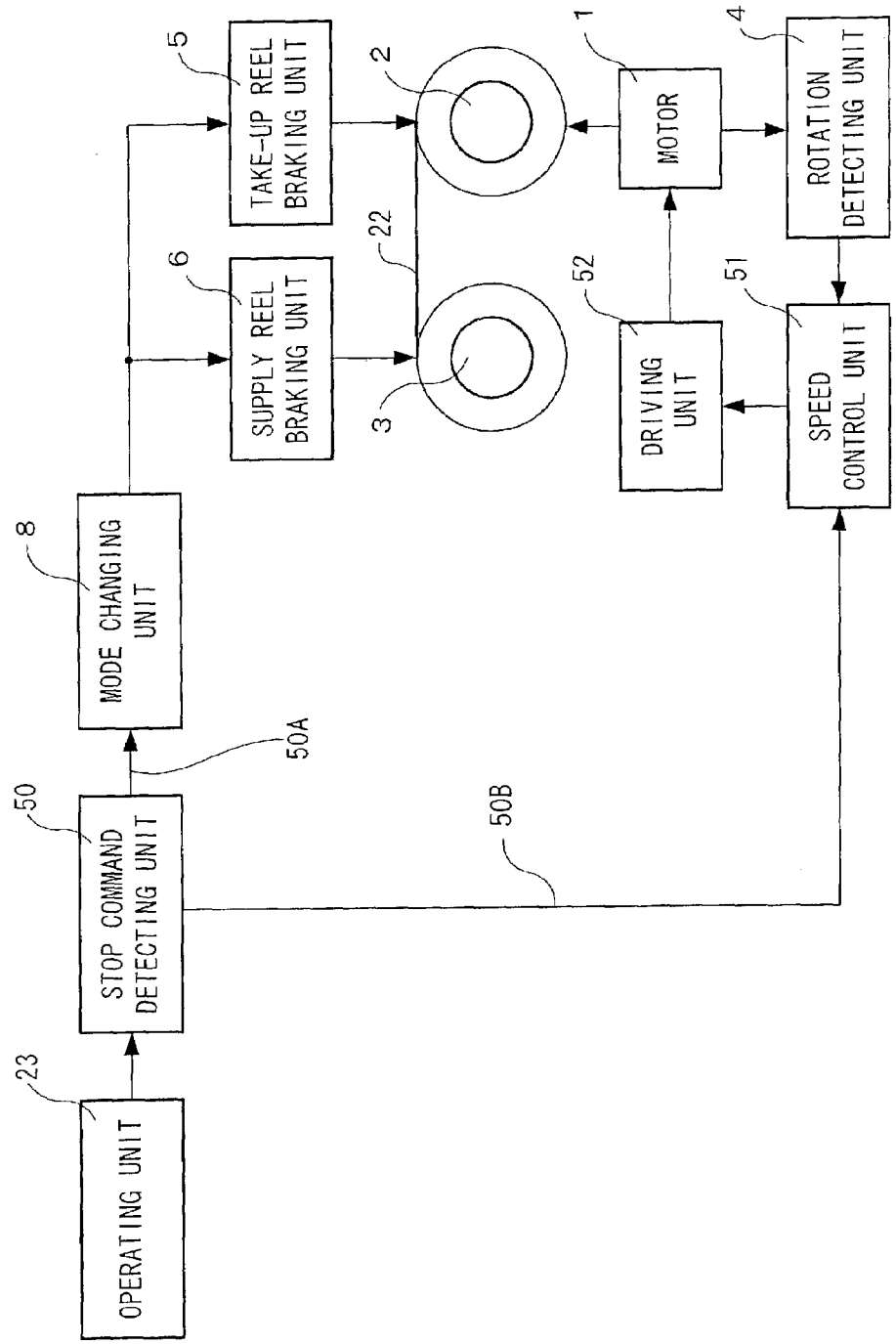
FIG. 5 is a structural diagram showing a conventional tape-like recording medium running device.

The same members as those of FIG. 5, which illustrates the conventional art, are indicated by the same reference numerals.

A tape-like recording medium running device of FIG. 1 is quite different from FIG. 5 in that a motor current value setting unit 11, a current adding time setting unit 12, and a motor current control unit 13 are provided.

The motor current value setting unit 11 sets a value of current applied to a motor 1 in response to the output of a stop command detecting unit 7.

The current adding time setting unit 12 sets time for applying the current set by the motor current value setting unit 11 to the motor 1.

The motor current control unit 13 applies the current value set by the motor current value setting unit 11 to the motor 1 for the time set by the current adding time setting means 12.

The motor current value setting unit 11, the current adding time setting unit 12, and the motor current control unit 13 can be obtained by software processing in a microcomputer (not shown).

Next, the configuration of FIG. 1 will be discussed in detail in accordance with operation examples shown in FIG. 2(a) to FIG. 2(e).

Discussed in the following is an example of a transition to a stop mode from a fast forwarding (FF) mode, in which a tape 22 is wound up from a supply reel 3 to a take-up reel 2 at a high speed.

In the fast forwarding (FF) mode, a rotation command is outputted by a speed control unit 9 so that the tape 22 is wound up from the supply reel 3 to the take-up reel 2 at a high speed (e.g., 10 m/s), and the motor 1 is operated via a driving unit 10.

At this point, as shown in FIG. 2(a), current of a value C flows into the motor 1. The current value C is changed by a running load of the tape 22. When a command for stopping the fast forwarding mode (FF) is inputted at timing T1 from an operating unit 23, the stop command is detected by the stop command detecting unit 7.

When the stop command is detected, a mode changing unit 8 changes a mechanism to the stop mode and operates a take-up reel braking unit 5 and a supply reel braking unit 6 to brake the take-up reel 2 and the supply reel 3.

FIGS. 2(b) and 2(c) show the braking forces of the take-up reel braking unit 5 and the supply reel braking unit 6. At timing T1, the take-up reel braking unit 5 applies braking force BT to the take-up reel 2 and the supply reel braking unit 6 applies braking force BS to the supply reel 3.

Then, as shown in FIGS. 2(d) and 2(e), the take-up reel 2 and the supply reel 3 gradually decrease in number of rotations.

Besides, the take-up reel braking unit 5 and the supply reel braking unit 6 are varied in braking force as follows:

$$BT>BS.$$

The speed control unit 9 at timing T1 performs control to stop the rotation of the motor 1.

In a conventional tape-like recording medium device, when a stop command is inputted from an operating unit 23, current applied to the motor 1 is set at 0. Meanwhile, in the present embodiment, the motor current control unit 13 performs control so that current of a value A (the magnitude of the current value is C>A>0) set by the motor current value setting unit 11 is applied for time W (the length of the time is W>0) set by the current adding time setting unit 12.

Immediately after timing T1, current of the value A is applied to the motor 1 for the time W, so that the take-up reel 2 keeps rotating due to rotary torque and inertial force that are transmitted from the motor 1 and the supply reel 3 keeps rotating due to inertial force and tensile force which is generated by the winding of the take-up reel 2. The take-up reel 2 and the supply reel 3 are stopped at timing T4 in the end by braking forces applied by the take-up reel braking unit 5 and the supply reel braking unit 6. FIG. 2 shows that the take-up reel 2 and the supply reel 3 are simultaneously stopped at the timing T4, which is an ideal timing.

However, in reality, due to a slight error of braking forces of the take-up reel braking unit 5 and the supply reel braking unit 6 and a slight error of the operation of the mechanism, an actual stopping timing is somewhat shifted from the timing T4. No problem occurs when the take-up reel 2 is stopped after the supply reel 3.

At this point, a rotation torque Tm transmitted by the rotation of the motor 1 is set by the equation below, the rotation being determined by the current value A which has been set internally in advance, and the time W for adding current.

$$(Tt+Tm-Ttb) \geq (Ts-Tsb)$$

In this equation, "Tt" denotes a rotation torque generated by the inertial force of the take-up reel 2, "Ttb" denotes a braking torque applied to the take-up reel 2 by the take-up reel braking unit 5, "Ts" denotes a rotation torque generated by the inertial force of the supply reel 3, and "Tsb" is a braking torque applied to the supply reel 3 by the supply reel braking unit 6.

The current value A and the time T for adding current are set so as to establish the above relationship, so that even when the take-up reel 2 and the supply reel 3 vary in braking force applied to the take-up reel 2 and the supply reel 3 as indicated by the braking force BT and the braking force BS in FIGS. 2(b) and 2(c), the take-up reel 2 does not stop earlier than the supply reel 3 as shown in FIGS. 2(d) and 2(e).

Namely, in the present embodiment, current of the value A is supplied to the motor 1 for the time W immediately after the timing T1, so that the above equation is satisfied by adding the rotation torque Tm, for the time T, to the rotation torque Tt which is generated by inertial force of the take-up reel 2.

Further, under the condition that a slack is likely to occur on the tape 22, that is, under the condition that the braking force of the take-up reel 2 is set at the maximum braking force of the variations, the braking force of the supply reel 3 is set at the minimum braking force of the variations, the tape 22 runs at a high speed, and stopping is made from a position where the supply reel 3 has a large diameter, it is important to set the current value A and the time W so as to prevent the take-up reel 2 from stopping earlier than the supply reel 3.

To be specific, it is preferable to empirically obtain a current value A and time W as parameters. For example, the time T is firstly set at a desired time and the current value A is varied according to the time to determine an optimum value.

In this way, according to Embodiment, current of a value A set by the motor current value setting unit 11 is applied to the motor 1 for the time W set by the current adding time setting unit 12 in the stopping operation from the fast forwarding (FF) mode, so that it is possible to transmit rotary torque to the take-up reel 2 from the motor 1 to delay the damping of the rotation of the take-up reel 2. Thus, it is possible to prevent the take-up reel 2 from stopping earlier than the supply reel 3, to permit the take-up reel 2 to rotate until the supply reel 3 is stopped, and to stop the running of the take-up reel 22 with no slack.

Described above is an example of the fast forwarding (FF) mode for winding up the tape 22 at a high speed from the supply reel 3 serving as a supply side reel to the take-up reel 2 serving as a take-up side reel. The same operation can be performed in a rewinding (REW) mode for winding up the tape 22 at a high speed from the take-up reel 2 serving as a supply side reel to the supply reel 3 serving as a take-up side reel. To be specific, when stopping is made from the rewinding (REW) mode, braking forces are applied to the take-up reel 2 and the supply reel 3 from the take-up reel braking unit 5 and the supply reel braking unit 6, current of the value A is similarly applied to the motor 1 for the time W, rotary torque is transmitted from the motor 1 to the supply reel 3 serving as a take-up side reel, and the rotation of the supply reel 3 can be delayed in damping. Hence, it is possible to prevent the supply reel 3 from stopping earlier than the take-up reel 2.

Embodiment 2

Figure 3:
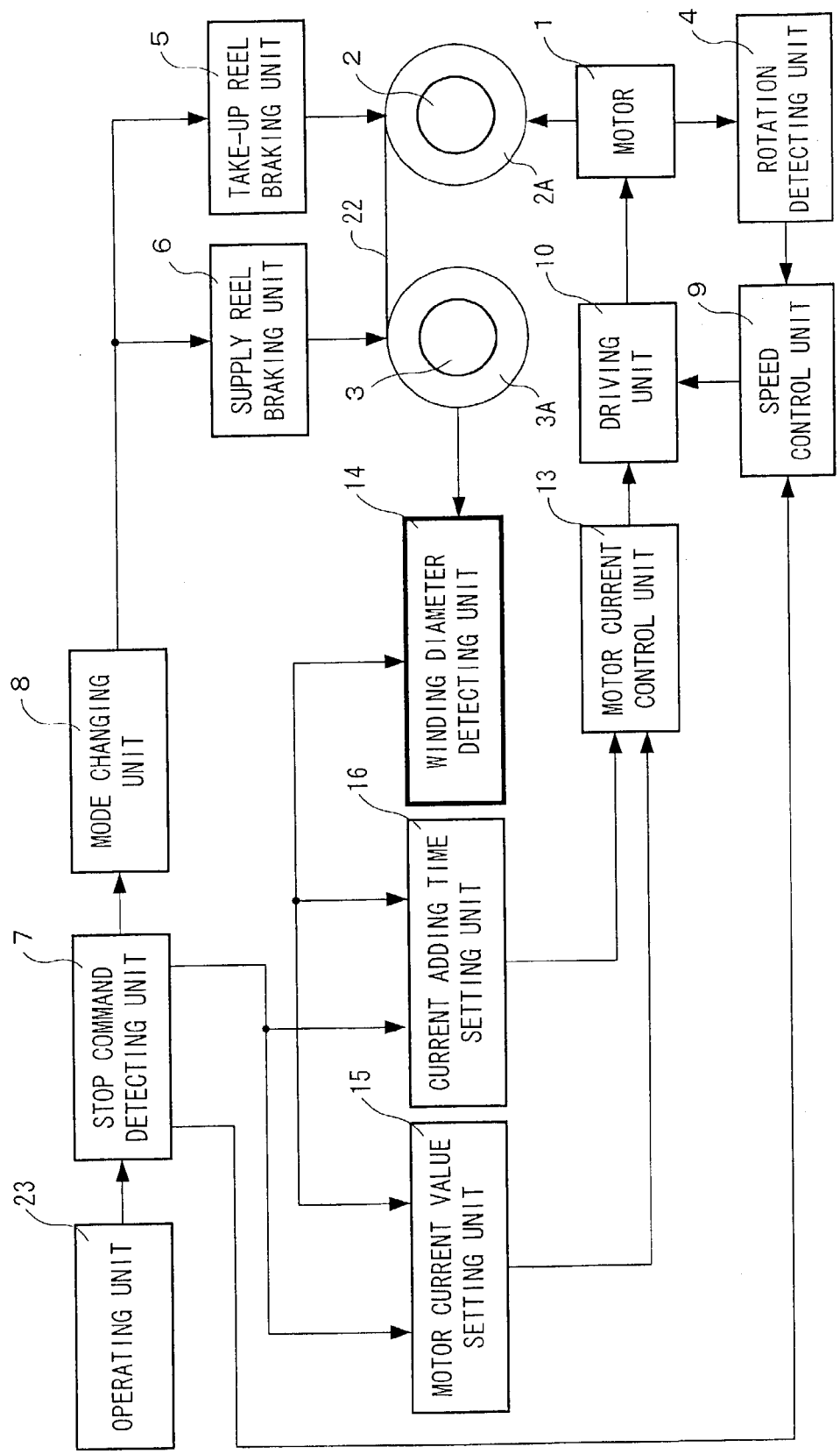
FIG. 3 is a structural diagram showing a tape-like recording medium running device according to Embodiment 2 of the present invention.
Figure 4:
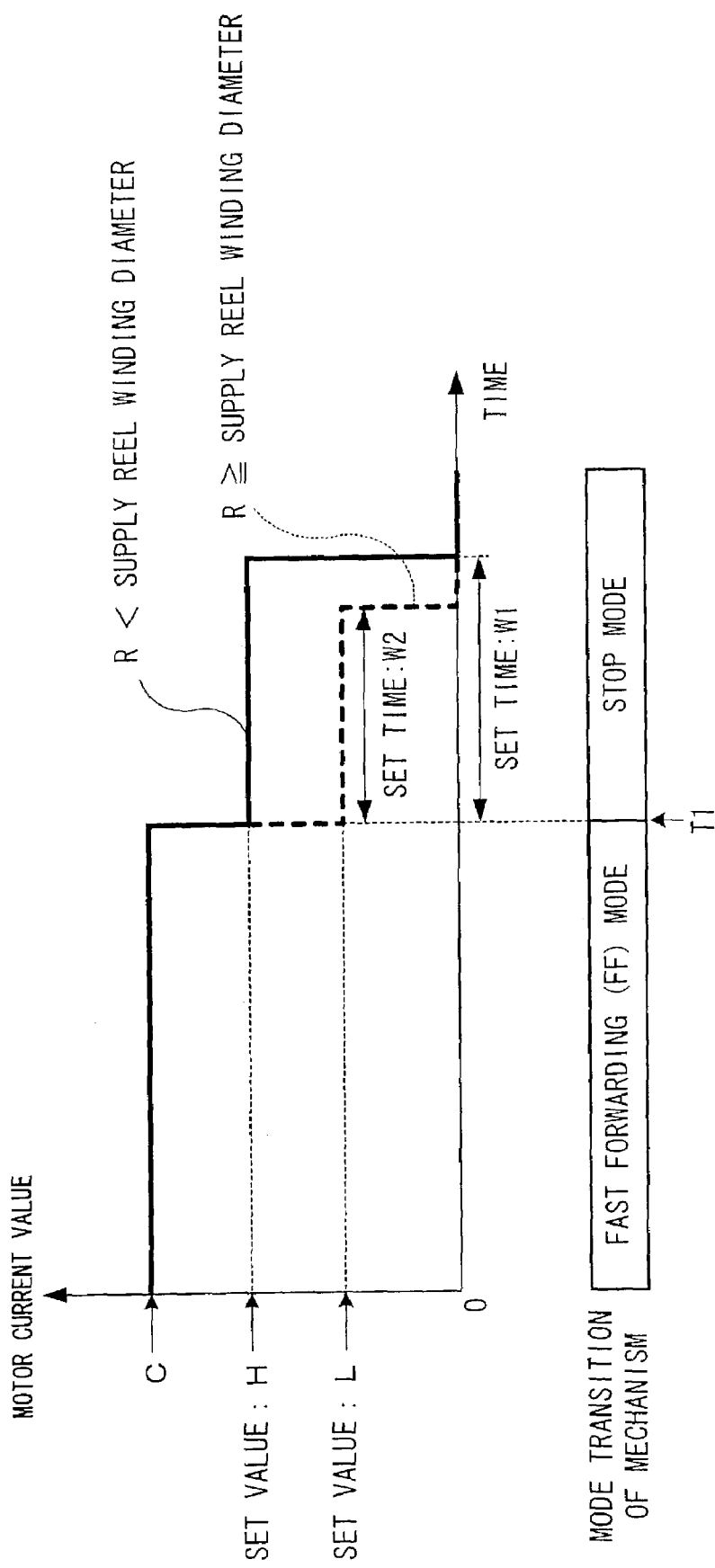
FIG. 4 shows changes of a motor current value with time when a transition is made from a fast forwarding (FF) mode to a stop mode of Embodiment 2.

FIGS. 3 and 4 show Embodiment 2 of the present invention.

The same members as those of FIG. 1 are indicated by the same reference numerals.

A tape-like recording medium running device of FIG. 3 is quite different from FIG. 1 in that a winding diameter detecting unit 14 is provided for detecting a winding diameter of a supply reel 3. In FIG. 1, the set values of the motor current value setting unit 11 and the current adding time setting unit 12 are constant regardless of a winding diameter of the supply reel 3. Meanwhile, according to Embodiment 2, set values can be automatically changed to optimum values according to a winding diameter of the supply reel 3.

In FIG. 3, reference numeral 15 denotes a motor current value setting unit for setting a value of current which is applied to the motor 1 in response to the output of a stop command detecting unit 7, reference numeral 16 denotes a current adding time setting unit for setting time for applying the current set by the motor current value setting unit 15 to the motor 1, and reference numeral 13 denotes a motor current control unit for applying current of the value set by the motor current value setting unit 15 to the motor 1 for the time set by the current adding time setting unit 16.

The set values outputted from the motor current value setting unit 15 and the current adding time setting unit 16 are automatically changed according to a detection output of the winding diameter detecting unit 14.

The motor current value setting unit 15, the current adding time setting unit 16, the motor current control unit 13, and the winding diameter detecting unit 14 can be obtained by software processing in a microcomputer (not shown).

Next, the configuration shown in FIG. 3 will be discussed in detail with reference to an operation example shown in FIG. 4.

Discussed in the following is an example of a transition to a stop mode from a fast forwarding (FF) mode in which a tape 22 is wound up from a supply reel 3 to a take-up reel 2 at a high speed.

In the fast forwarding (FF) mode, a rotation command is outputted by a speed control unit 9 so that the tape 22 is wound up from the supply reel 3 to the take-up reel 2 at a high speed (e.g., 10 m/s), and the motor 1 is operated via a driving unit 10.

The take-up reel 2, to which rotation is transmitted by the rotation of the motor 1, winds up the tape 22 from the supply reel 3.

At this point, as shown in FIG. 4, current of a predetermined value C flows into the motor 1. The current value C is changed by a running load of the tape 22. A running speed is controlled by a control system of the driving unit 10, the motor 1, a rotation detecting unit 4, and the speed control unit 9.

When a command for stopping the fast forwarding mode (FF) is inputted from an operating unit 23, the stop command is detected by the stop command detecting unit 7. When the stop command is detected, a mode changing unit 8 changes a mechanism to the stop mode and operates a take-up reel braking unit 5 and a supply reel braking unit 6 to brake the take-up reel 2 and the supply reel 3. A winding diameter of the supply reel 3 at the time the stop command is detected is detected in the winding diameter detecting unit 14.

The method of calculating a winding diameter in the winding diameter detecting unit 14 will be discussed below.

When it is assumed that a tape speed is V, the time for one rotation of the supply reel 3 is Tr, and the winding diameter of the tape 22 wound around the supply reel 3 is D, a length of the tape 22 sent by one rotation of the supply reel 3 is calculated by the following product.

$$V \cdot Tr$$

The outer periphery of the reel at this point is calculated by the following equation using the circular constant $\pi$.

$$\pi \cdot D$$

Since the tape 22 is wound up by the rotation of the take-up reel 2, the length and the outer periphery are equal as indicated by the following equation.

$$V \cdot Tr = \pi \cdot D$$

Therefore, a diameter D is calculated from both of the length and the outer periphery as indicated by the following equation.

$$D = V \cdot Tr / \pi$$

Besides, as a method of detecting the rotation of the supply reel 3, such a method is available that is for detecting a passage of a slit formed on the supply reel 3 by using a photosensor.

Described above is the method of calculating a winding diameter using the time for one rotation of the reel. When X (X is an integer of 2 or more) slits are formed on the reel, a winding diameter can be calculated from time spent for (1/X) times of rotation of the reel. Further, a winding diameter can also be calculated by causing an MR element to detect a passage of a magnetized portion formed on a part of the supply reel 3 instead of the slit formed on the supply reel 3, thereby to detect the rotation of the supply reel 3.

Figure 6:
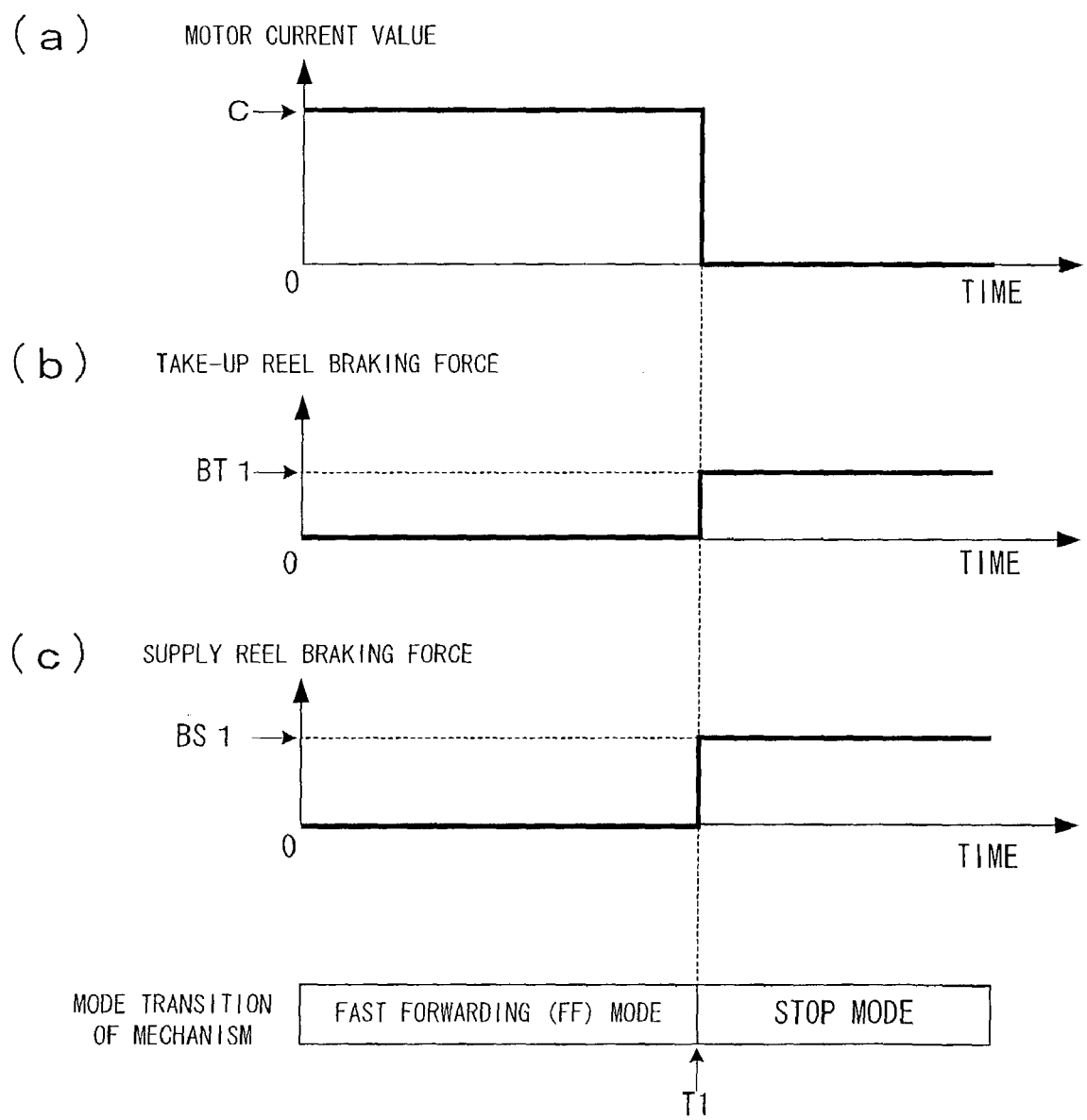
FIG. 6 shows a change of a current value with time when a transition is made from a fast forwarding (FF) mode to a stop mode according to the conventional art.
Figure 7:
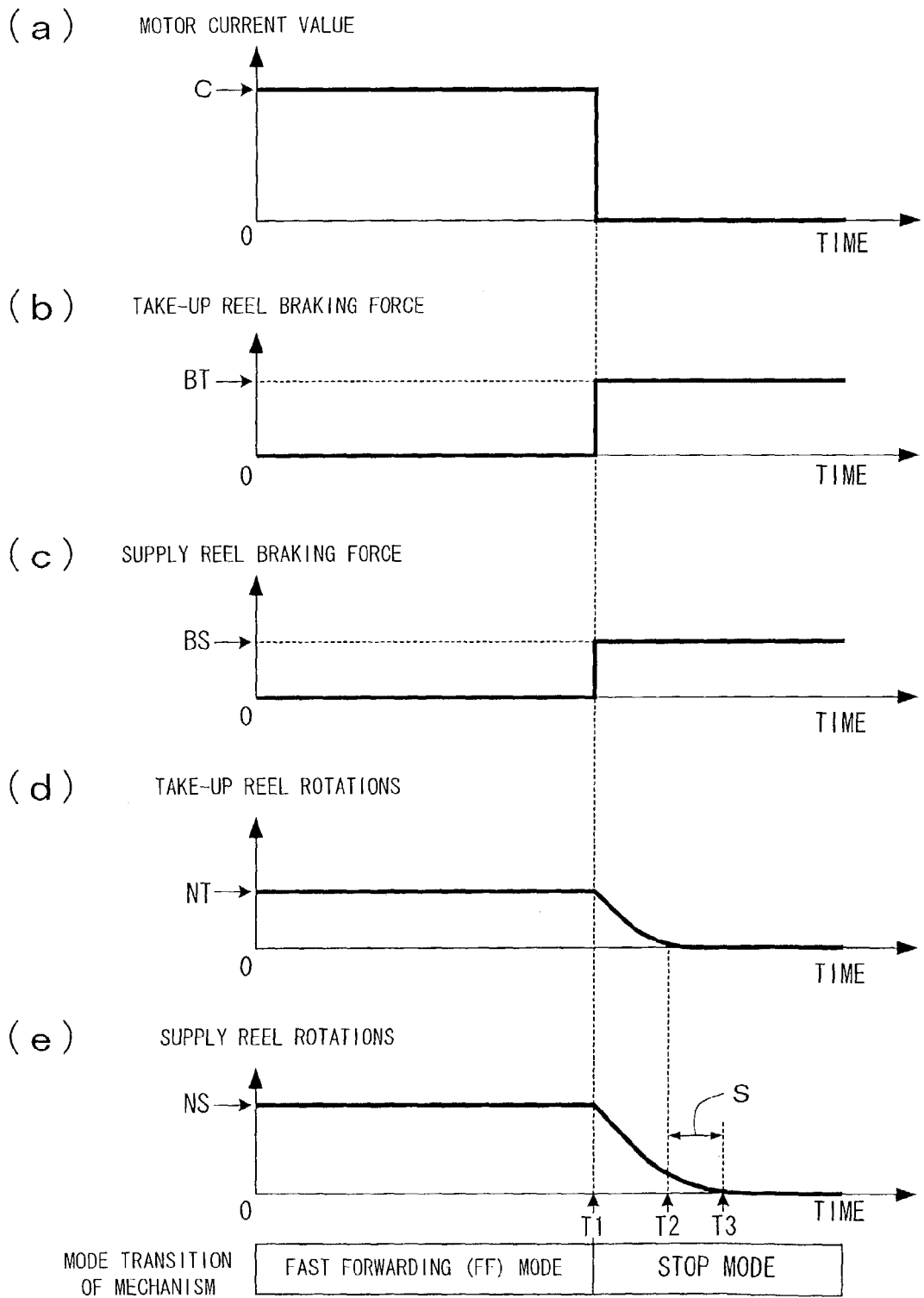
FIG. 7 shows actual changes with time of a motor current value and a number of rotations of a reel when a transition is made from the fast forwarding (FF) mode to the stop mode according to the conventional art.

The speed control unit 9 performs control to stop the rotation of the motor 1 at timing T1. In the conventional tape-like recording medium running device, current applied to the motor 1 is set at 0 as shown in FIG. 6. Meanwhile, in Embodiment 2, when a stop command is detected, in the case where a winding diameter of the supply reel 3 that is detected by the winding diameter detecting unit 14 is larger than a predetermined winding value R, a current value H (the magnitude of the current value is 0<H<C) is outputted as a set value from the motor current value setting unit 11. In this case, time W1 is outputted as a set value from the current adding time setting unit 12.

Hence, when a diameter of the supply reel 3 is larger than the predetermined winding diameter value R, the motor current control unit 13 performs control so that current of the set value H is applied for the time W1 immediately after timing T1.

Meanwhile, when a winding diameter of the supply reel 3 that is detected by the winding diameter detecting unit 14 is equal to or smaller than the predetermined winding diameter value R, a current value L (the magnitude of the current value is 0<L<H) is outputted as a set value from the motor current value setting unit 11. In this case, time W2 (the length of the time is T2<T1) is outputted as a set value from the current adding time setting unit 12.

Hence, when a winding diameter of the supply reel 3 is equal to or smaller than the predetermined winding diameter value R, the motor current control unit 13 performs control so that the set current value L is applied to the motor 1 for the time W2 immediately after the timing T1.

Thus, during a stopping operation immediately after the timing T1, rotary torques of different magnitudes are applied to the take-up reel 2 by the motor 1 in accordance with the winding diameter of the supply reel 3. Hence, it is possible to obtain more preferable results as compared with Embodiment 1 in which set values are constant regardless of the winding diameter of the supply reel 3.

In this way, the winding diameter detecting unit 14 is provided to detect a winding diameter of the supply reel 3 when the stop command is detected, and according to the winding diameter, a current value for application to the motor 1 and time for the application are changed to such values that cause no slack on the tape-like recording medium at each winding diameter. Thus, it is possible to prevent any current larger than necessary from being applied to the motor 1 for time longer than necessary, in order to prevent occurrence of a slack on the tape-like recording medium, to stop the tape 22 with no slack, to shorten time required from stopping the tape 22 till detecting the stop command, and to reduce an amount of the tape 22 sent from a position of detecting the stop command to a position of completing the stopping operation.

Although, the two examples have been described above, in which the supply reel 3 is larger in winding diameter than the predetermined winding diameter value R, and the supply reel 3 is equal to or smaller than the predetermined winding diameter value R, a plurality of reference winding diameters may be provided to set a motor current value and a current adding time in accordance with each of the winding diameters. At this point, as the supply reel 3 is smaller in winding diameter when the stop command is detected, the set value of the motor current value and the set value of the current adding time are reduced. This is because as the supply reel 3 is smaller in winding diameter when the stop command is detected, the supply reel 3 has a smaller inertial force and sends a smaller amount of the tape 22 for one rotation, the takeup reel 2 has a larger winding diameter and a larger inertial force, and the amount of the tape 22 wound up for one rotation is larger, thus a slack is less likely to occur on the tape 22. Namely, according to the winding diameter of the supply reel 3, current of an optimum value required to prevent occurrence of a slack on the tape-like recording medium can be applied for each winding diameter for an optimum length of time.

In the above description, the winding diameter detecting unit 14 detects a winding diameter of the supply reel 3 to set a motor current value and a current adding time are according to the winding diameter of the supply reel 3, but it is also preferable to detect a winding diameter of the take-up reel 2 to set the values according to the winding diameter of the take-up reel 2. In this case, the detected winding diameter increases with the passage of time from the start of the fast forwarding (FF) mode.

Further, in the above description, both of the current value and the set time of the motor 1 are controlled based on their values detected by the winding diameter detecting unit 14, but the control may be performed based on either one of the values.

Described above is the fast forwarding (FF) mode for winding up the tape 22 at a high speed from the supply reel 3 serving as a supply side reel to the take-up reel 2 serving as a take-up side reel, but the same operation can be performed alike in a rewinding (REW) mode for winding up the tape 22 at a high speed from the take-up reel 2 serving as a supply side reel to the supply reel 3 serving as a take-up side reel. To be specific, when stopping the rewinding (REW) mode, braking forces are applied to the take-up reel 2 and the supply reel 3 from the take-up reel braking unit 5 and the supply reel braking unit 6, current of a value corresponding to the winding diameter of the tape 22 on the supply reel 3 or the take-up reel 2 is applied in like manner to the motor 1 for a length of time corresponding to the winding diameter, and rotary torque is transmitted from the motor 1 to the supply reel 3 serving as a take-up reel to allow the rotation of the supply reel 3 to be delayed in damping. Hence, it is possible to prevent the supply reel 3 from stopping earlier than the take-up reel 2. Although both of the current value and the set time of the motor 1 are controlled based on the values detected by the winding diameter detecting unit 14, the control may be performed based on either one of the values.

According to the present invention, as mentioned above, even when the reels are varied in braking force during the stopping operation from the fast forwarding/rewinding modes, the supply side reel is always rotated together with the take-up side reel until the supply reel is stopped, providing an advantageous effect that the tape-like recording medium can be stopped with no slack. Particularly, according to the present invention, as the tape-like recording medium increases in transfer speed, the more advantageous effect can be provided.

What is claimed is:

1. A tape-like recording medium running device, in which a take-up side reel is driven by a motor to perform running for winding up a tape-like recording medium from a supply side reel, comprising:
    a take-up side reel braking unit for braking a rotation of the take-up side reel,
    a supply-side reel braking unit for braking a rotation of the supply side reel,
    a stop command detecting unit for detecting a command to stop the running for winding,
    a motor current value setting unit for controlling a current value for driving the motor, and
    a current adding time setting unit for controlling specified time for supplying current specified by the motor current value setting unit to the motor,
    wherein immediately after the stop command detecting unit detects a stop command, the take-up side reel braking unit and the supply side reel braking unit start braking the take-up side reel and the supply side reel, and the motor current value setting unit and the current adding time setting unit apply current to the motor so that rotary torque is given to the take-up side reel.

2. The tape-like recording medium running device according to claim 1, further comprising a winding diameter detecting unit for detecting a winding diameter of the tape-like recording medium wound around the supply side reel or the take-up side reel, whereby the motor current value setting unit changes a value of current applied to the motor according to the winding diameter detected by the winding diameter detecting unit.

3. The tape-like recording medium running device according to claim 1, further comprising a winding diameter detecting unit for detecting a winding diameter of the tape-like recording medium wound around the supply side reel or the take-up side reel, whereby the current adding time setting unit changes time for applying current to the motor according to the winding diameter detected by the winding diameter detecting unit.

4. The tape-like recording medium running device according to claim 1, further comprising a winding diameter detecting unit for detecting a winding diameter of the tape-like recording medium wound around the supply side reel or the take-up side reel, whereby the motor current value setting unit changes a value of current applied to the motor according to the winding diameter detected by the winding diameter detecting unit, and the current adding time setting unit changes time for applying current to the motor according to the winding diameter detected by the winding diameter detecting unit.

* * * * *